April 5, 1966 L. V. S. LUNDAHL 3,244,361
TOOTHED PARING DEVICE FOR A CENTRIFUGE
Filed Dec. 6, 1961 2 Sheets-Sheet 2
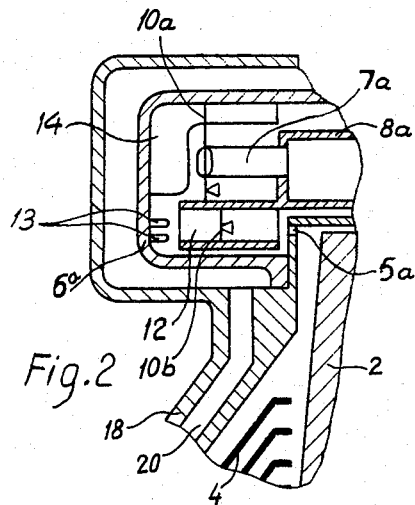
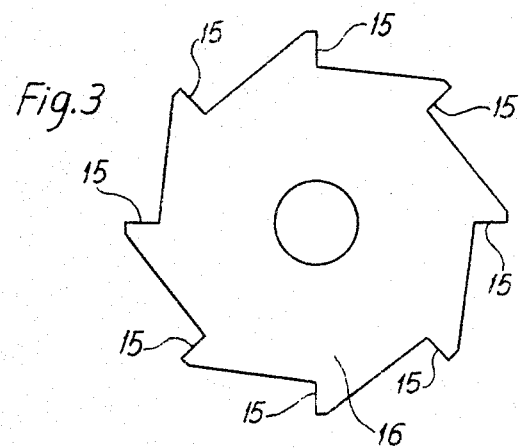
INVENTOR.
Lennart V.S. Lundahl United States Patent Office 3,244,361
Patented Apr. 5, 1966

3,244,361
TOOTHED PARING DEVICE FOR A CENTRIFUGE
Lennart V. S. Lundahl, Tumba, Sweden, assignor to Aktiebolaget Separator, Stockholm, Sweden, a corporation of Sweden
Filed Dec. 6, 1961, Ser. No. 157,433
Claims priority, application Sweden, Dec. 10, 1960, 11,983/60
6 Claims. (Cl. 233—22)

The present invention relates to homogenizing of liquids or liquid mixtures, and more particularly to an improved method and apparatus for this purpose.

It is known in the art to attach homogenizing means to a paring disk in a centrifugal separator. By so doing, a homogenization has been obtained which, determined according to the Farral-index-method, was about 20. This Farral-index is described for example, in "Homogenized Milk—A Review and Guide" by G. Malcolm Trout, published in 1950 by Michigan State College Press, East Lansing, Michigan. It is a measure of the number of fat globules in various diameter grades which can be counted by means of a microscope on a predetermined area of a sample of the liquid after homogenization. In certain countries it is required that the Farral-index be lower than about 15 if the homogenizing of milk is to be considered as satisfactory. This required degree of homogenization of milk could, therefore, not be obtained by the homogenizing means previously used in a centrifugal separator at the rated output of the separator; but such homogenization of milk had to be carried out in special, separately driven homogenizing devices in which the liquid to be homogenized is forced through an homogenizing nozzle. However, the power consumption of these homogenizing devices is so high in comparison with homogenizing in the paring disk of a separator that in many countries, the inferior homogenizing in a paring disk has been tolerated.

The present invention makes it possible to attain a degree of homogenizing of about 10, according to the Farral-index-method, through homogenizing by means of a paring disk in a centrifugal separator. This effect is obtained essentially by virtue of achieving a great difference in velocity between the liquid or the liquid mixture and a drag element arranged below the free level of the liquid or the liquid mixture. As a result, an increase of 40% in the homogenizing efficiency has even been obtained.

The homogenizing method and apparatus of the present invention are suitable for various uses but may be used to particular advantage in centrifuges, such as milk separators, where a discontinuous phase (fat globules) is separated from a continuous phase (milk) in order to obtain a liquid (cream) of a certain concentration. To provide the lowest possible power consumption in such a situation, it is preferable that the new method and apparatus be used for homogenizing the discontinuous phase.

The apparatus of the present invention comprises a container provided with an inlet and an outlet for the liquid and mounted for rotation so that the liquid forms a free liquid level in the container, and a drag element disposed to effect a relative velocity between the drag element and the liquid in the container, due to rotation of the latter, and which is arranged below this free liquid level.

Thus, a higher velocity gradient than was previously possible is obtained in various parts of the liquid, whereby the improved homogenizing effect is achieved. If the difference in velocity is so great that the pressure in the liquid is lower than the vaporization pressure at the temperature of the liquid, the liquid phase turns into a gaseous phase and a cavitation occurs which contributes to the required homogenization of the liquid. In view of this cavitation, the drag element is arranged so that the homogenization takes place below the free level of the liquid.

During the condensation of the gaseous phase which occurs in the course of cavitation when the pressure in the liquid again rises above the vaporization pressure, very high pressures arise at the condensation points, which can also be considered as contributing to the homogenization effect because it tends to cause division of the large particles contained in the liquid or liquid mixture or to perforate the skin surrounding the particles (fat globules) of the discontinuous phase (the cream).

In order to obtain the most favorable homogenizing effect with the new method and apparatus, the so-called cavitation coefficient, which is a measure of the static pressure, the vaporization pressure and the velocity ratio of the liquid, has to be taken into account. Thus, this cavitation coefficient indicates the conditions to be fulfilled if vaporization is to occur but not the pressure arising during condensation, and, therefore, the factors included in the cavitation coefficient must be weighed against each other in order to obtain the highest homogenization according to the present invention.

For a better understanding of the invention, reference may be had to the accompanying drawings, in which:

FIG. 2 is a similar view of part of a centrifuge embodying a modified form of the homogenizing apparatus, wherein the drag element is secured to the wall of the paring chamber of the centrifuge, and FIG. 3 is a plan view of another form of the drag element in the shape of a saw-toothed disk, which is adapted to form a cover on a paring disk of the centrifuge.

Figure 1:
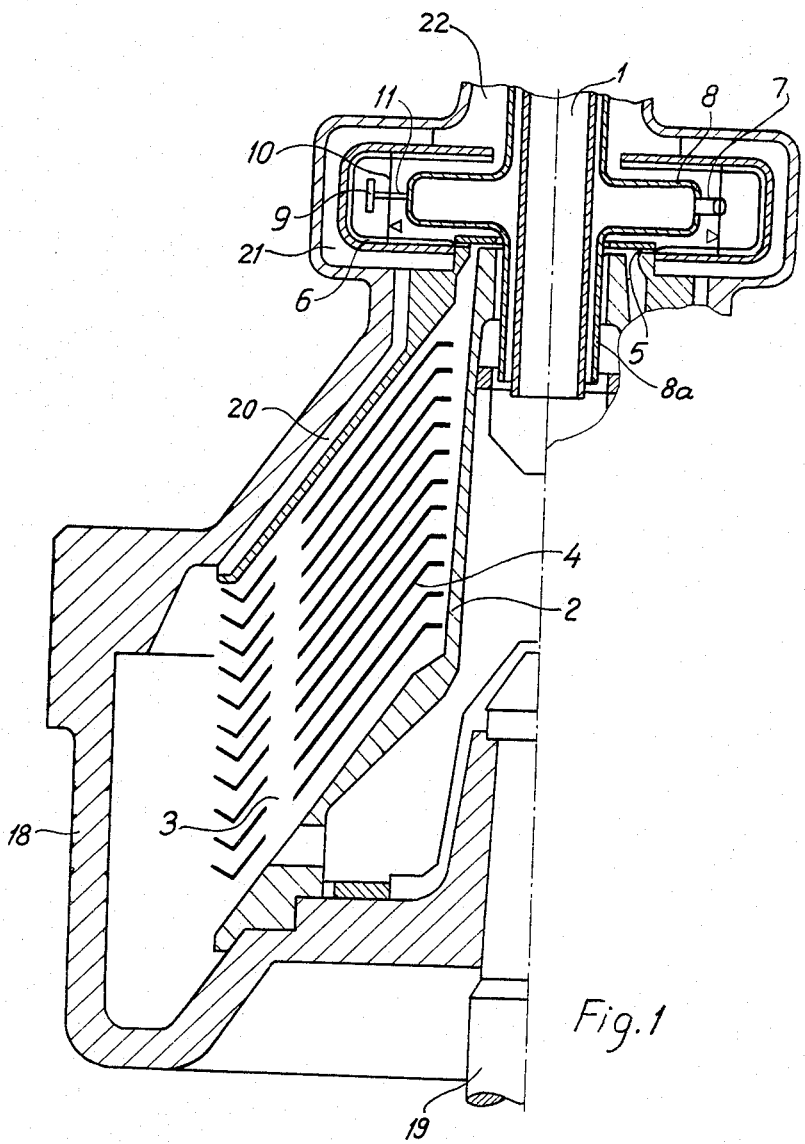
FIG. 1 is a vertical sectional view of a centrifugal separator embodying one form of the new homogenizing apparatus, showing a drag element secured by means of a thin arm to the paring disk in the centrifuge.

As shown in FIG. 1, the liquid or liquid mixture to be homogenized is fed through a stationary inlet tube 1 via a distributor 2 to the distribution holes 3 in the disk set 4 located in the separating chamber of the centrifuge bowl or rotor 18, as is customary. In this set of disks 4 the discontinuous phase (e.g., cream) is separated and displaced toward the center of the disk set, from where it passes upward and outward through a hole 5 to a paring chamber 6 forming part of bowl 18 and rotating therewith. In the paring chamber 6 the liquid (this term as used hereinafter includes a liquid mixture) is homogenized, as will be described in more detail presently. The liquid is thereafter reconveyed to the distributor 2 by means of a stationary paring member 7 in the usual form of a tube which pares liquid from the free surface of the rotating body of liquid at level 10. This pared liquid from tube 7 enters a stationary housing 8 supporting this tube and flows downward through an annular passage between inlet tube 1 and a surrounding tubular portion 8a of housing 8. Through the open lower end of this annular passage, the homogenized liquid enters distributor 2 where it is mixed with the liquid fed in through the inlet tube 1.

The homogenization of the liquid is ensured by a drag element 9 which is entirely immersed below the free liquid level 10 formed by the rotation of the paring chamber 6. This drag element 9 is secured to the stationary housing 8 of the paring member 7 by means of a thin arm 11. This arm can be secured directly to housing 8 or to its paring member 7. The drag element 9 is shown in the form of a narrow rectangular member, one of the flat edges of which is arranged perpendicularly to the liquid flow direction.

It will be understood that feed tube 1 and housing 8, the upper portion of which is likewise tubular and concentric to tube 1, are secured to a stationary structure (not shown) above the rotary bowl 18, the latter being mounted on and driven by an axial spindle 19. The continuous phase (milk) passing to the outer part of the separating chamber surrounding disks 4 will include a substantial part of the homogenized discontinuous phase (cream) and flows upwardly through channels 20 into the space 21 between the bowl neck and the wall of paring chamber 6, its final discharge being upwardly by way of an annular passage 22 through the top of the bowl neck. Also, it will be understood that while only one drag element 9 is illustrated, a plurality of these elements may be mounted on and spaced around the housing 8.

Referring now to FIG. 2, I have shown two drag elements which, like the drag element 9 in FIG. 1, are entirely universal in the liquid body of separated discontinuous phase in the paring chamber, shown at 6a in FIG. 2. From the inner edges of disks 4, this discontinuous phase flows upwardly and then outwardly under centrifugal force through a hole 5a opening toward paring chamber 6a. The liquid discharging from hole 5a meets a series of stationary radial blades 12 spaced around the rotation axis of centrifugal bowl 18, these blades being mounted on the stationary housing 8a of the tubular paring device 7a and being located well below the latter. Due to the rotation of bowl 18, the flow direction of liquid from hole 5a is essentially tangential but is changed to an essentially radial direction by the radial blades 12 on which the flow impinges. The blades 12 extend radially a considerable distance toward the outer wall of paring chamber 6a. The drag elements 13, which are located in a gap between this outer wall and the outer ends of blades 12, are firmly secured to the peripheral wall of the rotating paring chamber and are arranged adjacent to each other along this wall.

It will be observed that in both the FIG. 1 and the FIG. 2 embodiments, the velocity gradient between each drag element 9 or 13 and the immersing liquid is obtained through rotation of the liquid container formed by paring chamber 6 or 6a. In FIG. 1, the drag element 9 is held stationary and immersed in liquid which is being rotated by the paring chamber; whereas in FIG. 2 each drag element 13 is rotated with the paring chamber while immersed in liquid which, due to the action of radial blades 12, is undergoing substantially no rotation. At its upper portion, the paring chamber 6a in FIG. 2 has radial wings 14 which serve to effect rotation of the liquid at the region of paring tube 7a, whereby the liquid at this upper region has a free liquid level 10a. Thus, at the lower portion of the paring chamber, where blades 12 act to impede rotation of the liquid, the free liquid level will be displaced farther inward toward the rotation axis, as shown at 10b.

In the FIG. 2 embodiment as well as that shown in FIG. 1, the great difference in velocity between the liquid and each drag element creates considerable velocity gradients, which results in cavitation and thus promotes homogenization.

Drag elements of still another form, adapted to generate cavitation and thus homogenization, are shown in FIG. 3. In this case, the drag elements are formed by small rectangular areas 15 arranged on a thin disk 16 in the same way as the cutting teeth of a circular saw-blade, the disk 16 is arranged so as to constitute a cover for the conventional stationary paring disk in the centrifuge, the usual axial discharge tube of the paring disk extending vertically through the central hole in disk 16. Eight such areas 15 are, as shown, arranged perpendicularly to the flow direction and in a radial plane in relation to the axis of the centrifuge, but their number can be larger or smaller and they can present a width of about 16 mm. on a disk 16 having a thickness of 2 mm. The areas 15 can also be arranged like the cross-set teeth of a circular saw-blade. On the side of each drag element 15, the edge of the disk 16 is arranged so as to adjoin, with a soft-rounded dorsal part, the adjacent area 15 arranged as a drag element. The liquid flows clockwise in relation to this disk 16. The disk 16 will, for example, be mounted in paring chamber 6 on top of housing 8, with the outer parts of the areas 15 located at the same radius as drag element 9, whereby the latter may be omitted.

All drag members 9, 13 and 15 for homogenization, which have been shown and described, should have such a shape and their number should be such that they create the least possible flow resistance in relation to the required increase of the homogenizing effect.

I claim:

1. In a centrifugal separator, the combination of a rotary centrifugal bowl forming a separating chamber and also forming a paring chamber communicating with the separating chamber for receiving a separated liquid therefrom, the rotating bowl being adapted to rotate at least part of a body of said liquid in the paring chamber so that said liquid body forms a free liquid level in the paring chamber, a hollow stationary paring device in the paring chamber for paring liquid from said rotating part of said liquid body at the free level thereof, and a stationary imperforate drag element secured to the stationary paring device in position to be immersed in said liquid body below the free level thereof, said paring device forming a passage spaced from the drag element and leading from said free level for discharging liquid pared from said body, said drag element forming a means for inducing cavitation in the liquid body below said free level.

2. The combination according to claim 1, in which the paring device has an inlet opening for receiving pared liquid from said body, the drag element being located at a substantially greater radius from the rotation axis of the bowl than is said inlet opening.

3. Apparatus for homogenizing a liquid, which comprises a rotationally driven container having a liquid inlet and a liquid outlet, said container being operable to rotate at least part of a body of liquid therein about the rotation axis so that the liquid forms a free liquid level in the container, a stationary paring device located in the container for paring liquid from the rotating part of said liquid body at the free level thereof, the paring device having a passage forming said outlet and leading from said free level for discharging liquid pared from said body, and cavitation inducing means including imperforate stationary drag elements secured to the paring device in position to be immersed in said liquid body below the free level thereof and in spaced relation to said passage, whereby rotation of the container generates a substantial velocity gradient between said drag elements and the portion of said liquid body in which the drag elements are immersed.

4. Apparatus according to claim 3, in which said drag elements are teeth spaced around the periphery of the pairing device.

5. Apparatus according to claim 3, in which said device is a paring disk forming said liquid outlet and operable to pare liquid from said rotating body into said outlet.

6. Apparatus according to claim 3, comprising also a rotary centrifugal bowl carrying said container and forming a separating chamber communicating with said container inlet, said inlet being adapted to deliver a centrifugally separated liquid from said chamber to the container, said device being a paring disk forming said liquid outlet and operable to pare liquid from said rotating body into said outlet.

References Cited by the Examiner
UNITED STATES PATENTS

| | | | |
|---|---|---|---|
| 503,731 | 8/1893 | Anderson | 233—10 |
| 1,542,747 | 6/1925 | Verney | 233—10 |
| 2,125,453 | 8/1938 | Lindgren | 233—22 |
| 2,612,356 | 9/1952 | Borck | 233—22 X |
| 2,667,338 | 1/1954 | Hemfort | 259—3 |
| 2,673,075 | 3/1954 | Borck | 259—3 |
| 2,873,064 | 2/1959 | Diefenbach | 233—10 |

M. CARY NELSON, *Primary Examiner.*
HESTER B. MARTIN, *Examiner.*